United States Patent [19]
Maritzen et al.

[11] Patent Number: 5,870,719
[45] Date of Patent: *Feb. 9, 1999

[54] PLATFORM-INDEPENDENT, USAGE-INDEPENDENT, AND ACCESS-INDEPENDENT DISTRIBUTED QUOTE CONFIGURATON SYSTEM

[75] Inventors: L.M. Maritzen; Rolando D. Dimaandal, both of Milpitas; Julia Giannella, Saratoga; Raul Arregui, Pacifica; Marc Moss, Fremont, all of Calif.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 675,683

[22] Filed: Jul. 3, 1996

[51] Int. Cl.$^6$ .................................... G06F 17/60
[52] U.S. Cl. ..................... 705/26; 345/329; 345/333; 345/334; 345/335; 364/400; 395/200.33; 395/200.47; 395/200.49; 395/200.6; 705/35; 707/104
[58] Field of Search ................ 364/400, 464.1, 364/479.01, 479.02, 479.04, 479.06; 395/200.6, 200.33, 200.47, 200.48, 200.49, 201, 226, 227, 329, 330, 331, 333, 334, 335; 705/1, 26, 27, 400, 35; 345/329, 330, 331, 333, 334, 335; 707/104

[56] References Cited

U.S. PATENT DOCUMENTS

| | | | |
|---|---|---|---|
| 3,314,049 | 4/1967 | Felcheck | 705/15 |
| 4,473,824 | 9/1984 | Claytor | 340/825.27 |
| 5,331,543 | 7/1994 | Yajima et al. | 705/31 |
| 5,357,439 | 10/1994 | Matsuzaki et al. | 364/468.02 |
| 5,570,291 | 10/1996 | Dudle et al. | 364/468.01 |
| 5,666,493 | 9/1997 | Wojcik et al. | 705/26 |
| 5,694,546 | 12/1997 | Reisman | 395/200.9 |
| 5,710,887 | 1/1998 | Chelliah et al. | 395/226 |

*Primary Examiner*—Edward R. Cosimano
*Attorney, Agent, or Firm*—Blakely Sokoloff Taylor & Zafman

[57] ABSTRACT

A platform-independent, usage-independent, location-independent quote configuration system is described. The present invention, operating in a computer network, is a quote configurator comprising, 1) a client module, the client module having a platform-independent user interface for receiving quote input and command selections from a user, the quote input and command selections including product selection and selection of information indicative of business rules, and 2) a server coupled to the client module across the network, the server having access to quote data and business rules, the server including a platform-independent server interface configured to receive the quote input and command selections from the client module, the server validating the quote input based on the quote data and the business rules.

24 Claims, 7 Drawing Sheets

FIG. 5

PLATFORM-INDEPENDENT, USAGE-INDEPENDENT, AND ACCESS-INDEPENDENT DISTRIBUTED QUOTE CONFIGURATON SYSTEM

FIELD OF THE INVENTION

The present invention relates to the field of distributed computer systems. Specifically, the present invention relates to the field of distributed computer systems for configuring and providing pricing and quotation information regardless of usage or access model and independent of platform type.

BACKGROUND OF THE INVENTION

Pricing and quotation information is produced at different points and different geographic locations in the sales process. Some of the key triggers used to produce this information include product sales, volume discounts, warranty terms, sales/lease contract terms, contract renewals or modifications, or special customer requests. Often times, quotations or quotes produced as a result of these triggers vary substantially based on the business unit or geographic location for which a particular quote is targeted. These variations are also caused by the different computer platforms, systems, usage models and networks used to assemble the quote information. Variations can also be caused by lack of, or differing, in-depth knowledge of the specific business rules and discounts that apply to each scenario, location, and business unit. In some cases, duplicate and redundant information must be reformatted or translated to a form compatible with a component of the quote generation system. In other cases, information must be manually entered. This is due in large part to the rigid data input requirements of conventional quote configuration systems.

The limitations in current quote configuration systems result in quotes that are difficult to generate and maintain, which contain errors that impact the customer and the business units, and require manual entry of redundant information at each step of the process.

Thus, a platform-independent, usage-independent, location-independent quote configuration systems which is capable of encapsulating the business logic and business unit expertise to produce consistent, accurate results is needed.

SUMMARY OF THE INVENTION

A platform-independent, usage-independent, location-independent quote configuration system is described. The present invention, operating in a computer network, is a quote configurator comprising, 1) a client module, the client module having a platform-independent user interface for receiving quote input and command selections from a user, the quote input and command selections including product selection and selection of information indicative of business rules, and 2) a server coupled to the client module across the network, the server having access to quote data and business rules, the server including a platform-independent server interface configured to receive the quote input and command selections from the client module, the server validating the quote input based on the quote data and the business rules.

Thus, it is an advantage of the present invention over conventional systems that the present invention is based on a non-procedural data-driven work flow design. It is a further advantage of the present invention that the point of service provides a real-time, interactive model for interaction on all components with the user. It is a further advantage of the present invention that all business rules and expertise needed to provide intelligent quoting are encapsulated within the quote configuration system, and are transferable and usable anywhere on any platform. This enables the design to be scalable with localization possible to accommodate variations in attributes such as currency and price list. It is a further advantage of the present invention that the present invention is based on an open architecture to enable integration with other systems, business processes and technologies. It is a further advantage of the present invention that the present invention is platform-independent (ex. SPARC™, RISC, X86). It is a further advantage of the present invention that the present invention is independent of usage model (ex. nomadic, remote/dial-up, inter-networked, intra-networked). It is a further advantage of the present invention that the present invention is independent of access model (ex. stand-alone application, networked application, web-based application, web-based applet).

The features and advantages of the present invention will be apparent from the accompanying drawings and from the detailed description of the preferred embodiment of the present invention as set forth below.

BRIEF DESCRIPTION OF THE DRAWINGS

The present invention is illustrated by way of example and not limitation in the accompanying drawings, in which:

FIG. 5 illustrates a sample screen display of the graphical user interface of the preferred embodiment.

DETAILED DESCRIPTION OF THE PREFERRED EMBODIMENT

The present invention is a platform-independent, usage-independent, location-independent quote configuration system. In the following detailed description, numerous specific details are set forth in order to provide a thorough understanding of the present invention. However, it will be apparent to one of ordinary skill in the art that these specific details need not be used to practice the present invention. In other instances, well-known structures, interfaces and processes have not been shown in detail in order not to unnecessarily obscure the present invention.

Figure 4:
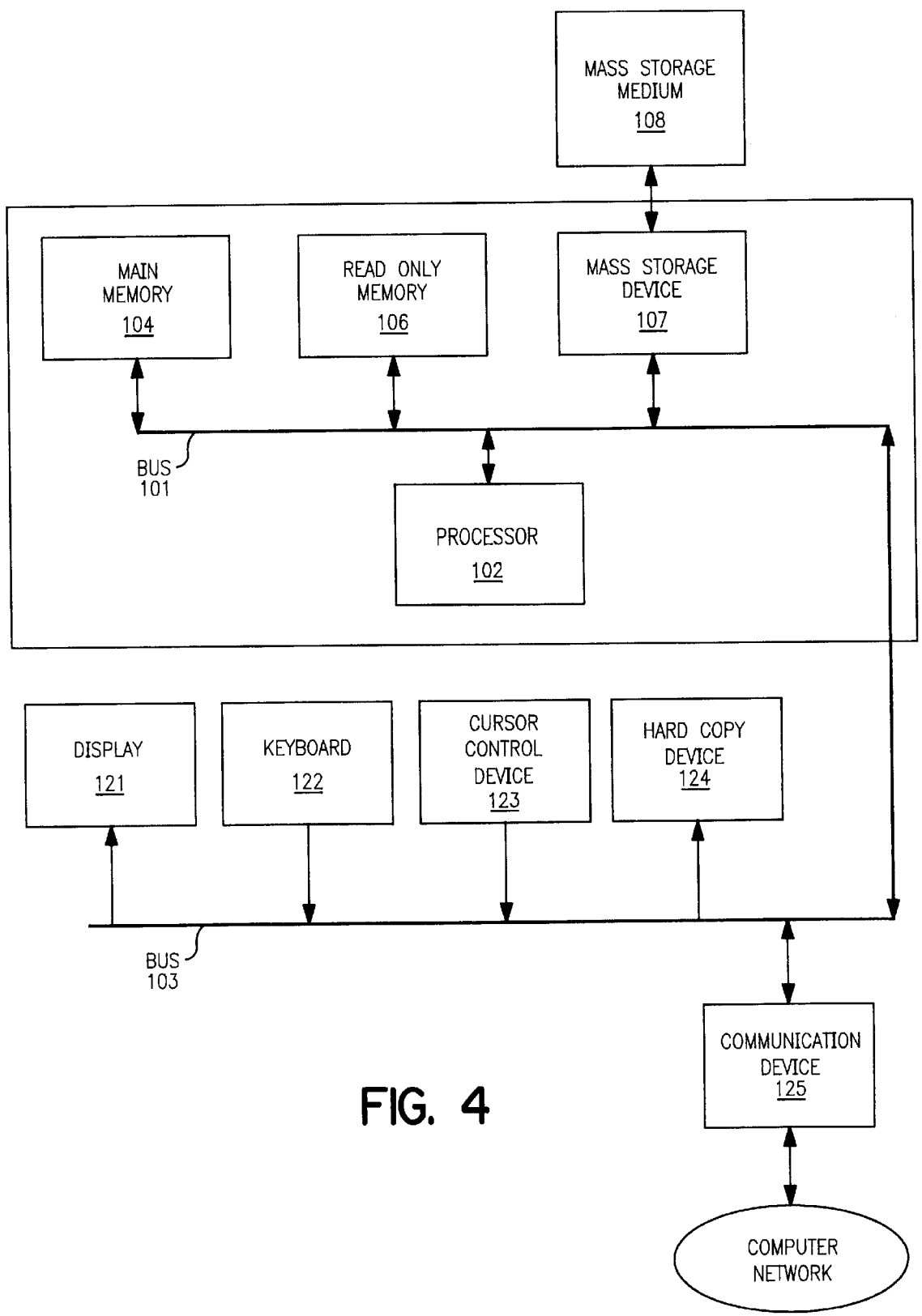
FIG. 4 illustrates a typical data processing system or platform upon which one embodiment of the present invention is implemented.

FIG. 4 illustrates a typical data processing system or platform upon which one embodiment of the present invention is implemented. It will be apparent to those of ordinary skill in the art, however that other alternative systems of various system architectures may also be used. The data processing system illustrated in FIG. 4 includes a bus or other internal communication means 101 for communicating information, and a processor 102 coupled to the bus 101 for processing information. The system further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. The system also comprises a read only memory (ROM) and/or static storage device 106 coupled to bus 101 for storing static information and instructions for processor 102, and a data mass storage device 107 such as a magnetic disk drive or optical disk drive. Data storage device 107 is coupled to bus 101 and is typically used with a computer readable mass storage medium 108, such as a magnetic or optical disk, for storage of information and instructions. The system may further be coupled to a display device 121, such as a cathode ray tube (CRT) or a liquid crystal display (LCD) coupled to bus 101 through bus 103 for displaying information to a computer user. An alphanumeric input device 122, including alphanumeric and other keys, may also be coupled to bus 101 through bus 103 for communicating information and command selections to processor 102. An additional user input device is cursor control 123, such as a mouse, a trackball, stylus, or cursor direction keys coupled to bus 101 through bus 103 for communicating direction information and command selections to processor 102, and for controlling cursor movement on display device 121. Another device which may optionally be coupled to bus 101 through bus 103 is a hard copy device 124 which may be used for printing instructions, data, or other information on a medium such as paper, film, or similar types of media. In the preferred embodiment, a communication device 125 is coupled to bus 101 through bus 103 for use in accessing other nodes of a network computer system. This communication device 125 may include any of a number of commercially available networking peripheral devices such as those used for coupling to an Ethernet, token ring, Internet, or wide area network.

Note that any or all of the components of the system illustrated in FIG. 4 and associated hardware may be used in various embodiments of the present invention; however, it will be appreciated by those of ordinary skill in the art that any configuration of the system may be used for various purposes according to the particular implementation. In one embodiment of the present invention, the data processing system illustrated in FIG. 4 is an IBM® compatible personal computer (PC) or a SUN® SPARC™ Workstation. Processor 102 may be one of the 80X86 compatible microprocessors such as the 80486 or PENTIUM® brand microprocessors manufactured by INTEL® Corporation of Santa Clara, Calif.

The software implementing the present invention can be stored in main memory 104, mass storage device 107, or other storage medium locally accessible to processor 102. It will be apparent to those of ordinary skill in the art that the methods and processes described herein can be implemented as software stored in main memory 104 or read only memory 106 and executed by processor 102. This software may also be resident on an article of manufacture comprising a computer usable mass storage medium 108 having computer readable program code embodied therein and being readable by the mass storage device 107 and for causing the processor 102 to perform quote transactions and protocols in accordance with the teachings herein.

The preferred embodiment of the present invention is a platform-independent, usage-independent, location-independent quote configuration system, which can be implemented on computer system platforms such as the one illustrated in FIG. 4.

ARCHITECTURE OF THE PREFERRED EMBODIMENT

Figure 1:
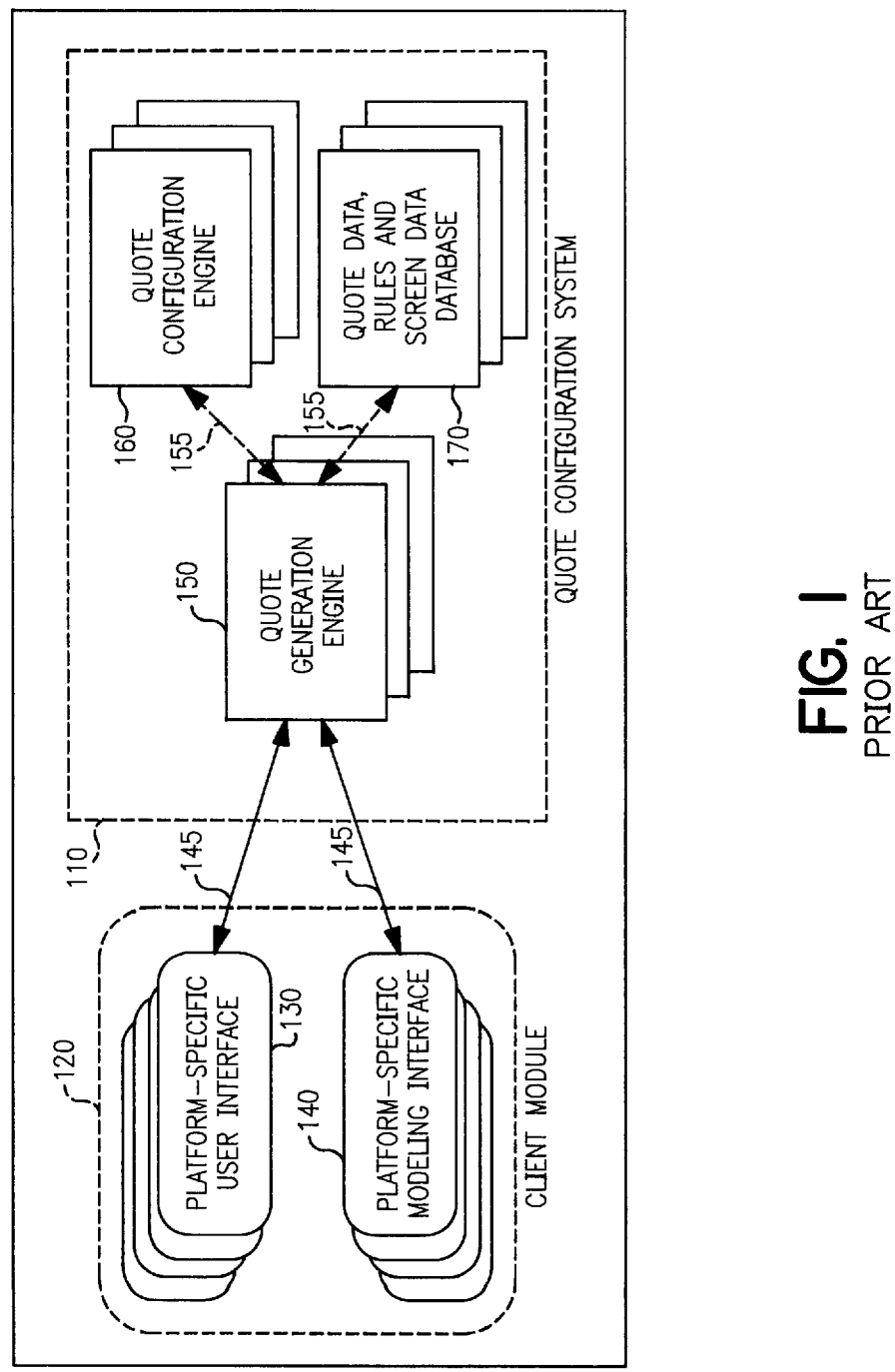
FIG. 1 illustrates the system architecture of a prior art quote configuration system.

FIG. 1 illustrates the typical quote configuration generation system currently used in the prior art. The architecture of a typical conventional quote processing system is based on a two-tier procedural model with deliberate data synchronization latency. The client module 120 is typically large, requiring significant local client resources (such as disk space, memory, swap space, etc.) to run the quote configuration system. The client module 120 includes a platform-specific modeling interface 140 and a platform-specific user interface 130. The client module 120 is coupled to a conventional quote configuration system 110 across a network connection using a transaction messaging mechanism 145, which is compatible with a conventional quote generation engine 150 in quote configuration system 110. Quote generation engine 150 is then coupled to quote configuration engine 160 and quote database 170 across an interface using an intrasystem communication protocol 155. Quote database 170 provides the quote data, rules, and screen data used by the quote generation engine 150 along with quote configuration engine 160 to generate a quote. Multiple configuration system databases are deployed to accommodate location-specific variables.

This prior art quote configuration methodology has several disadvantages, which are listed below:

1. A different platform-specific user interface 130 and client module 120 is necessary for each type of hardware architecture and operating system (OS) (i.e. platform) upon which the quote configuration system is deployed.

2. A different platform-specific user interface 130, client module 120, transaction messaging mechanism 145, and intrasystem communication protocol 155 is necessary for each type of usage model for which the quote configuration system is implemented. In conventional systems, the four usage models commonly utilized are nomadic, remote/dial-up, inter-networked and intra-networked. In a nomadic system, the client module is resident in a portable computer system, which only periodically and asynchronously connects to the quote configuration system. In a remote/dial-up model, the client module uses a dial-up modem protocol to asynchronously connect with the quote configuration system 110. In an inter-networked model, the client module uses Internet or World Wide Web (WWW) protocols to synchronously but indirectly connect to a quote configuration system. In an intra-networked model, the client module uses local area network (LAN) or wide-area network (WAN) protocols to synchronously and directly connect to a quote configuration system.

3. A different platform-specific user interface 130, client module 120, transaction messaging mechanism and intrasystem communication protocol is necessary for each type of access model for which the quote configuration system is implemented. The four access models commonly provided in conventional systems are stand-alone application, networked application, web-based application and web-based applet. Stand-alone applications are those software systems that run on a platform without network connectivity. Networked applications are those software systems that run on a platform with network connectivity and involve network transactions. The web-based models run on the World Wide Web (WWW) portion of the Internet and have dependencies on browser-specific implementations in addition to platform-specific dependencies. All four of these prior art access models have user interface screen rendering logic and data which is tightly integrated with the business rules and quote data in the quote configuration system 110.

4. The system architecture and application programming interfaces (APIs) are proprietary and closed.

5. The work flow design is strictly procedural in a batch style of processing and has deliberate latency built into the data synchronization model.

6. Distribution of the quote configuration system and client software, synchronization of quote data and business rules, and version control of the system are difficult to manage effectively.

7. A different quote configuration engine 160 and quote database 170 must be deployed to accommodate each location-specific environment.

8. The user interface 130 requires extensive knowledge of the underlying business rules and quote data to generate a configuration quote.

9. The prior art design is based on a two-tiered, non-distributed/non-networked model.

Figure 2:
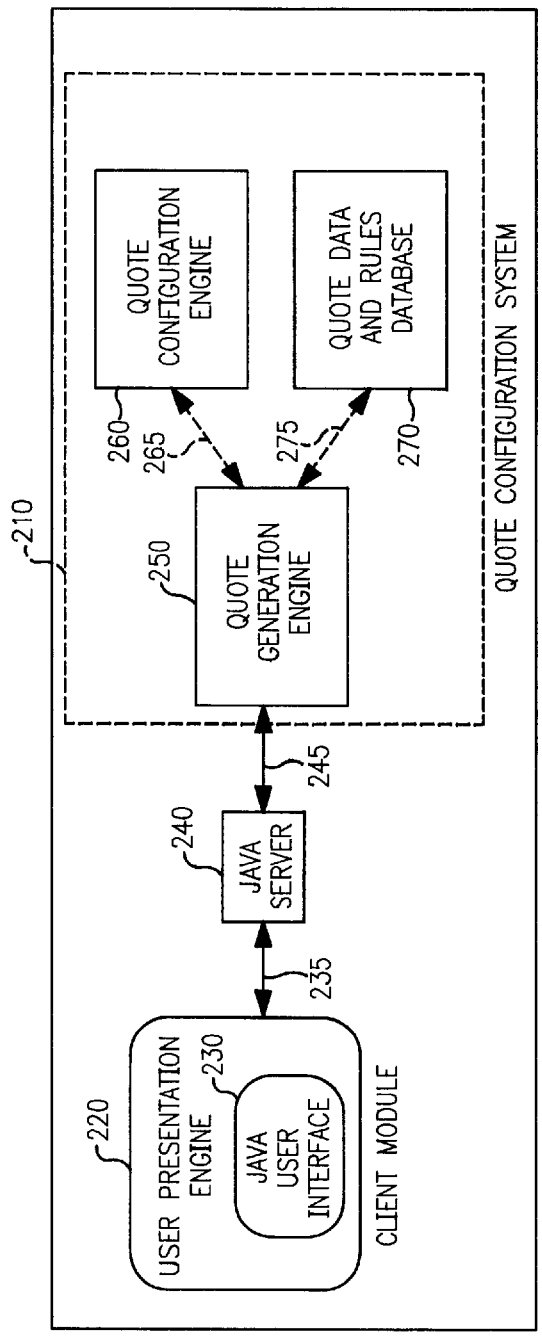
FIG. 2 illustrates the architecture of the quote configurator of the preferred embodiment of the present invention.

FIG. 2 illustrates the quote configurator of the preferred embodiment of the present invention. In the present invention all common configurations and usage models are enabled by a single architecture and single user interface model, including mobile computing devices (nomadics and remote access/dial-ups), local area networks (LANs), wide area networks (WANs) and the Internet network. In general, these components provide specific functionality for handling quotation information and for generating quotes.

The architecture of the present invention is based on a distributed three-tier object-oriented design model as shown in FIG. 2. A first tier is a client module 220. The second tier is a server 240 and the third tier is quote configuration system 210.

The client module 220 includes a JAVA™ user interface 230. JAVA is an object-oriented programming language similar to C++ developed by SUN® Microsystems of Mountain View, Calif. JAVA is unique in that a program written in JAVA is first compiled into byte-codes and subsequently interpreted into machine dependent processor instructions. Byte-codes are similar to machine instructions; however, byte-codes are not specific to a particular machine or platform. Thus, JAVA programs can run on any platform that supports JAVA. It is not necessary to recompile a JAVA program to run on a new machine. The JAVA user interface 230 may therefore be written without platform-specific code and without the need to create multiple versions that support multiple platforms.

Each tier of the system illustrated in FIG. 2 encapsulates all the necessary components for the intended function. All interfaces of the present invention are open and public. The messaging transport system of the present invention is based on socket-level communication protocol using open APIs at each end of the communications path, such as paths 235 and 245. Socket-level communication protocol in the context of a computer network is well known to those of ordinary skill in the art. The user presentation engine of client module 220, user interface 230, and JAVA server 240 components are platform-independent, usage-independent, and access-independent and based on a single code source. The JAVA server 240 API which interfaces path 245 to quote generation engine 250 is an essential element of the present invention. Similarly, the JAVA server 240 API which interfaces path 235 to client module 220 is also an essential element of the present invention. Specifically, the user interface component 230 is a graphical user interface (GUI) and looks and operates in exactly the same manner independently of platform, usage, and access model. The GUI 230 is fully interactive and intelligent, and requires absolutely no knowledge of the underlying business rules and quote data for a user to generate an accurate configuration quote. The interaction of the GUI 230 is field-based, data-driven and event-driven. The quote data and rules database 270 also contains new components to support the present invention.

The client module 220 API to quote generation engine 250 through JAVA server 240 comprises commands, which are formulated in a platform-independent text string format and sent to quote generation engine 250 via a socket interface of JAVA server 240. A specified port number is used by both the client module 220 and the quote generation engine 250. The quote generation engine 250 interprets these commands and sends back its replies to the client module 220 via the socket interface of JAVA server 240. A detailed description of the commands of this API follows.

Commands bload rtssun7b.cab

This command makes the quote generation engine 250 read and load (in memory) all information contained in the rtssun7b.cab file. This file contains all business rules and screen rendering information needed by the quote generation engine 250.

BEruntimeInit streamout

This command initiates runtime a communication protocol by the quote generation engine 250. The 'streamout' argument is a parameter that tells the quote generation engine 250 to use its socket layer interface for communication.

BEinsPickByIndex <field> <idx> 1

This command instructs the quote generation engine 250 to pick a <field> with index <idx> and return all information stored for this field. The <field> argument can be any of the following in the preferred embodiment:

| Contract | PriceBook | MarketingServices |
| ReplcHrdwrPrts | CstDefPrty | UnlimPhoneSprt |
| OnSiteResp | OnSiteResp2_hr | OnSiteCov7_24 |
| PrefCustomer | EndUser | MaintMan |
| Multiyr | | |

The <indx> argument is an integer value representing the index of the specified field.

Example: BEinsPickByIndex Contract 2 1
   (This sample command requests the quote generation engine 250 to retrieve all the information about the second field for contracts.)

BEinsValueSet NumberUsers val val <qty>

This command sets the quantity of products specified by the user. The <qty> argument is an integer value that represents the quantity of products.

BEreset

This command forces the quote generation engine 250 to ignore all previous input and start from the very beginning.

BEprequote

This command produces a pre-quote listing for the current session.

ueQuote

This command produces a final quote for the current session.

BEinsWhy <field> <state>

This command returns an explanation as to why a state of contradiction now exists for this <field>.

Example: BEinsWhy OnSiteResp2_hr 2 (This example asks why is there a contradiction in 2-hr response time?)

BEviewSummaryGet <windowname>

This command returns comprehensive information about a set of fields that logically belong to <windowname>.

Example: BEviewSummaryGet win4 (The quote generation engine 250 returns all current information and states of fields that belong to window 4.)

These interfaces and commands of the preferred embodiment are only a subset of the entire API; however, these commands are sufficient for an operable system. It will be apparent to those of ordinary skill in the art that other commands or command arguments may also be provided. Conversely, the interfaces 265 and 275 to the quote configuration engine 260 and quote database 270, respectively, are conventional interfaces.

OPERATION OF THE PREFERRED EMBODIMENT

Figure 3:
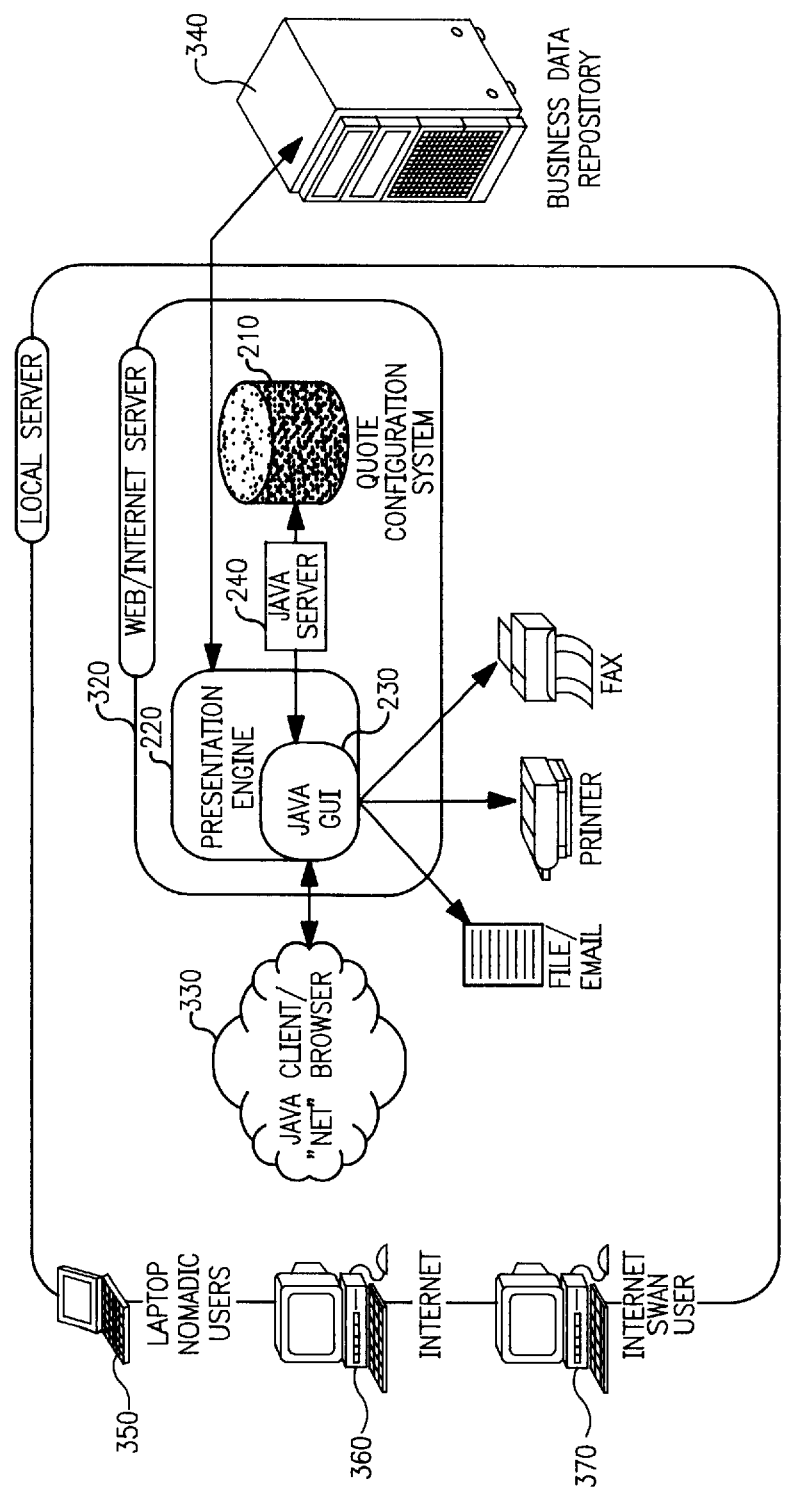
FIG. 3 illustrates the operation of the quote configurator of the preferred embodiment of the present invention.

FIG. 3 illustrates the operation of the quote configurator of the preferred embodiment of the present invention. The client module 220 communicates with JAVA server 240 and quote configuration system 210 in the context of the World Wide Web (WWW) and the Internet 320. The client module 220 may also gather other business data from repository 340. Network users of the present invention such as nomadic users 350, Internet users 360, or intranet users 370 may access the client module 220 of the present invention via JAVA client/net browser 330. Once these network users connect to the client module 220, the users may request and view quote information. Quote information may also be printed, faxed, filed, or emailed via output devices connected to client module 220.

The following sample scenario will demonstrate an example of the quote configuration process of the present invention for generating a custom quote from both the user and system perspective. This example will highlight the essential steps of the present invention as appropriate. In this description, no distinction is made regarding location of the user/system, access method of the user/system, or the type of platform on which either the user or system exists. The same process and model will work regardless of platform, access type, or usage model. FIGS. 2 and 3 are referenced in combination with the flow diagrams of FIGS. 6 and 7 to illustrate the operation of the present invention. In addition, the screen sample shown in FIG. 5 also referenced.

Figure 5:
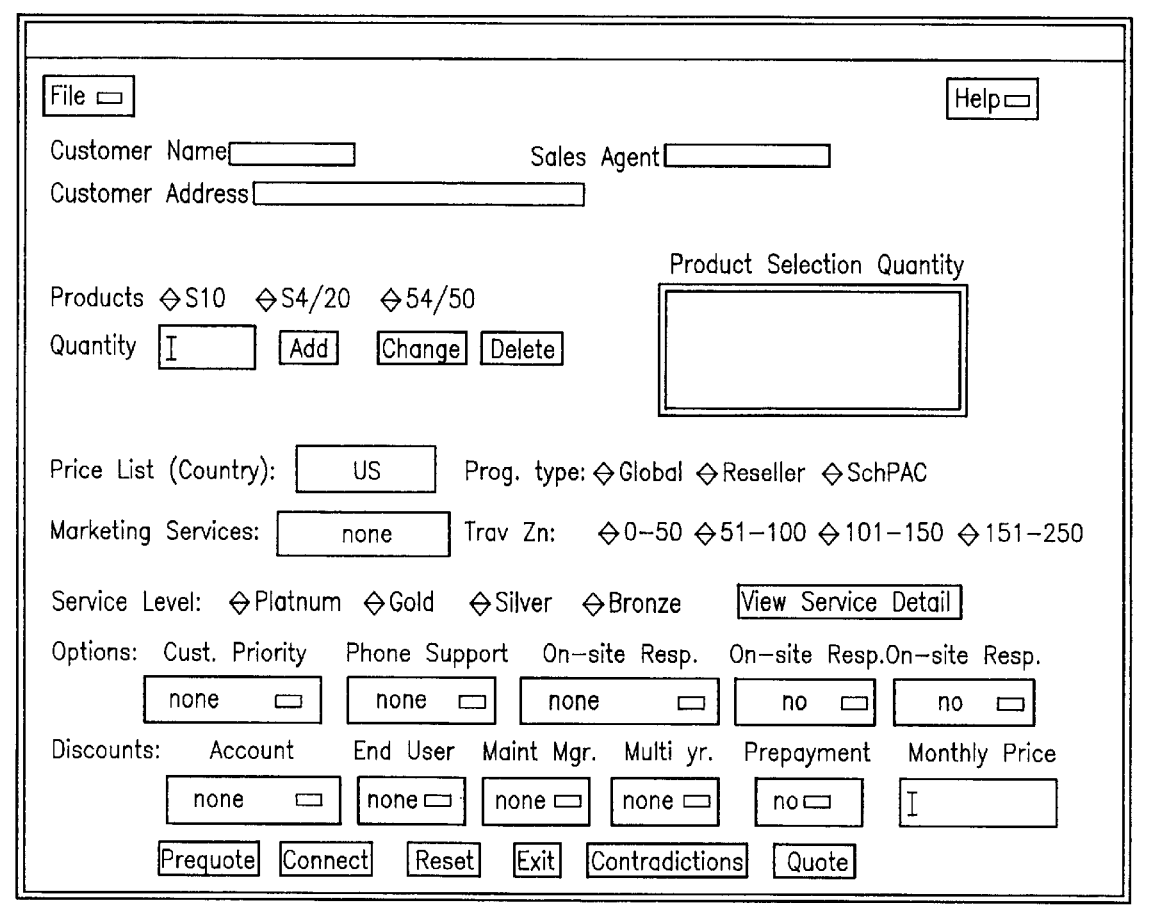

On initiation of the client module 220 of the present invention by the user, the GUI 230 establishes a socket connection with the JAVA server 240 in real-time, and loads an initial data set. In block 610, shown in FIG. 6, a main screen or window of the GUI 230 is then auto-populated with a series of default values as specified by the JAVA GUI 230, based on the encapsulated business rules. One such sample screen is illustrated in FIG. 5. These default values include Price Lists; Travel Zone; Service Level. At this point in the process, the user only needs to select a product type and enter a quantity in order to receive a quote. In this example, the user will be producing a custom quote.

1. User selects the product.

Figure 6:
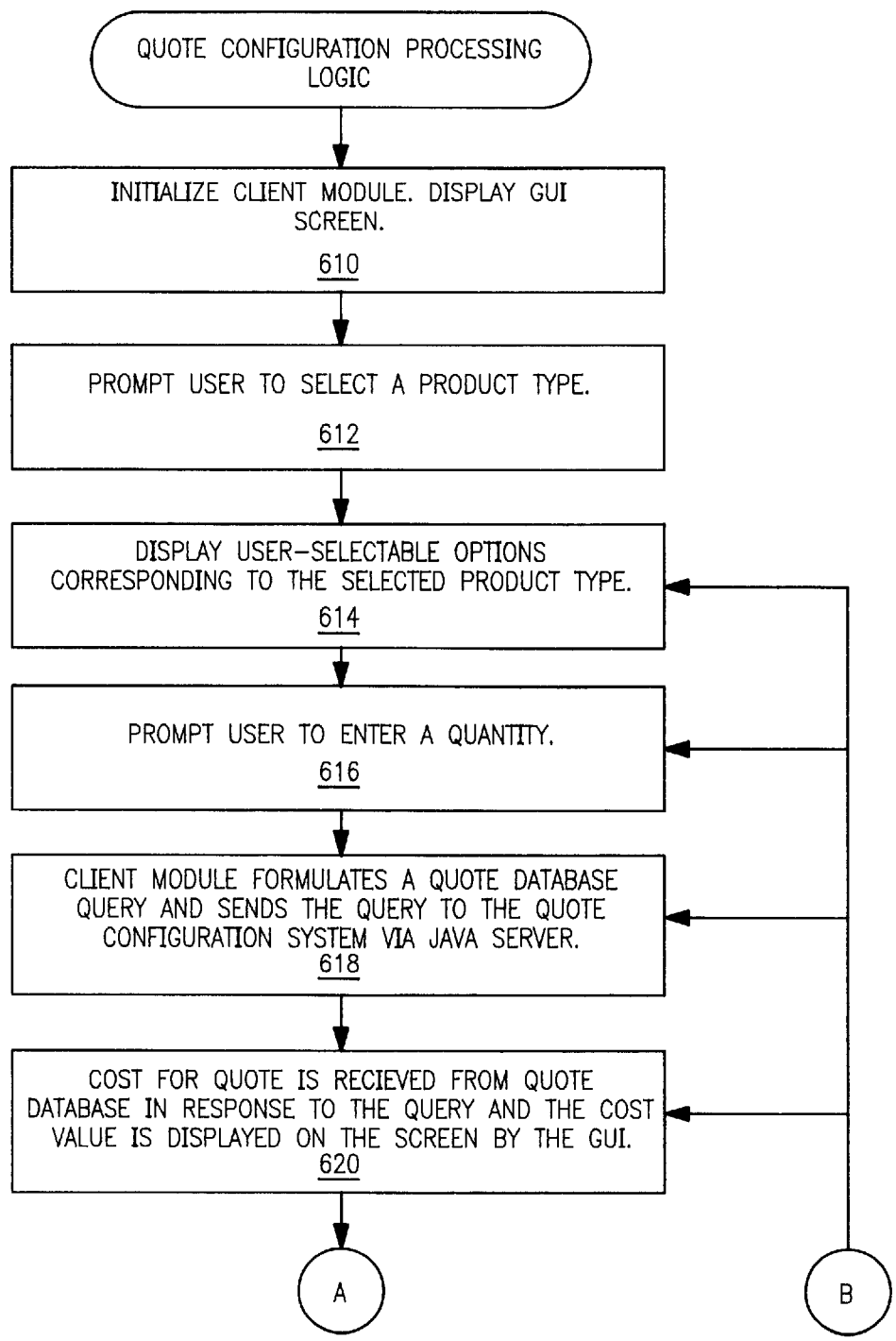
FIGS. 6 and 7 are flowcharts illustrating the operation of the preferred embodiment.

The user is prompted in block 612, shown in FIG. 6, with a pick list to select a product type or the user can ask for additional information/help. On selection of the product type from the pick list presented by the GUI 230, the GUI 230 logic updates the screen with appropriate user-selectable options, key hints and other information intended to assist the user with creation of the custom quote based on the user selection of product type (block 614).

2. User enters a quantity.

On entry of the quantity (block 616), the GUI 230 logic determines the initial total cost for the quote by using the JAVA server 240 and socket protocol via path 245 to query the quote database 270 (block 618), perform the calculations and update the appropriate portion of the screen of the GUI 230 (block 620). As denoted by bubble B shown in FIGS. 6 and 7, the user may iteratively select or edit the selections described in blocks 614–712.

3. User selects the types of coverage desired.

Figure 7:
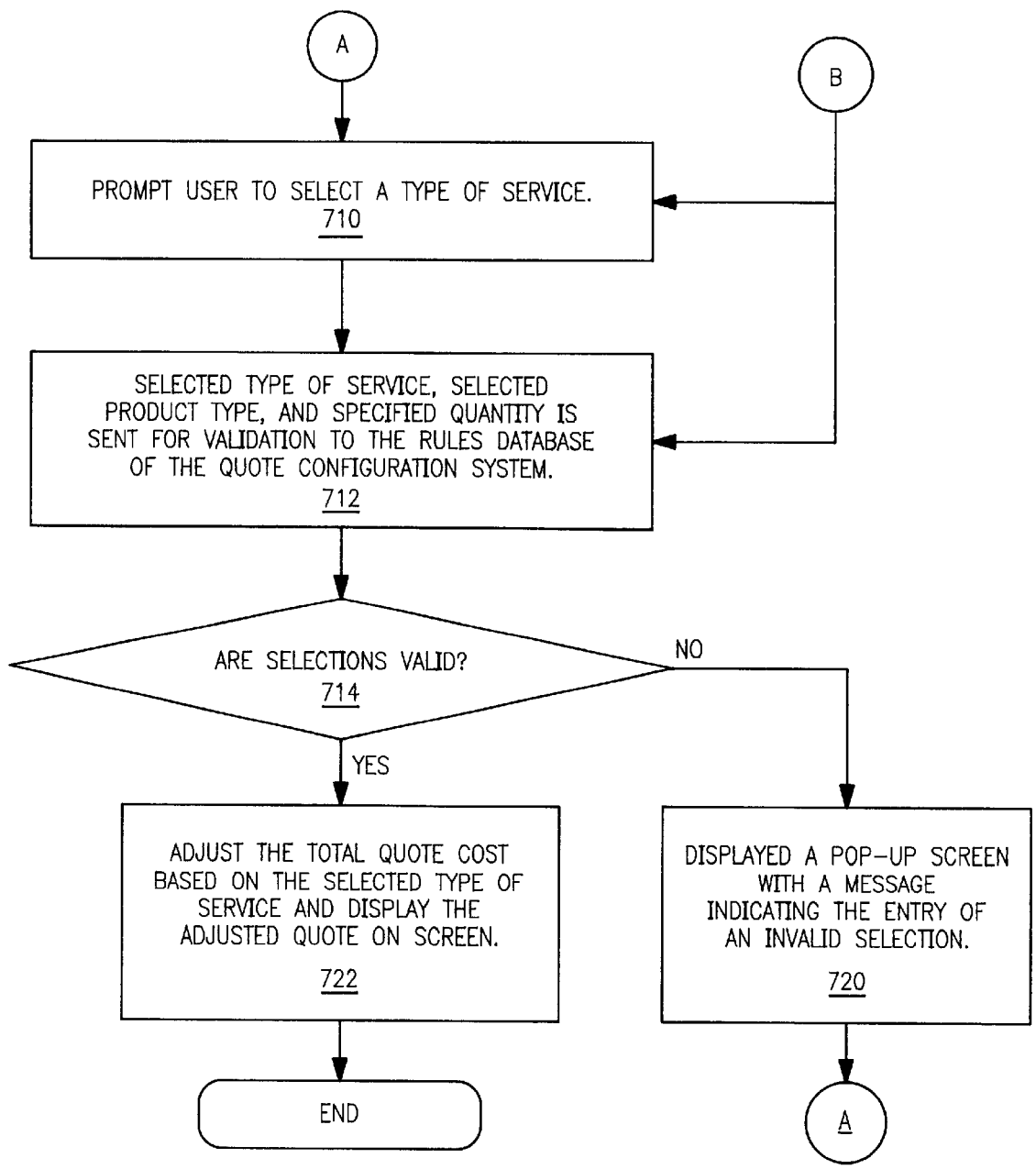

Referring now to FIG. 7, selection of the type of coverage provides an adjustment in total quote cost based on the type service selected (blocks 710 and 712 shown in FIG. 7). This selection of type of coverage identifies a set of business rules which is applied to the request. If this type of coverage is not available for the selected product type and the specified quantity, the business rule of the quote configuration system quote database will indicate an invalid condition which is communicated to the GUI 230 via JAVA server 240 (block 714). This invalid condition causes a pop-up screen to appear for the user (block 720). The pop-up screen contains information and navigation/event assistance for the user. These pop-up screens indicating invalid conditions, warnings and hints can be displayed at any time and triggered by any appropriate event; because, the JAVA server 240 and quote configuration system 210 are in frequent communication regarding of the state of the GUI 230 and selected events/options. Also, the user can "override" the suggestion/warning pop-up screen message and proceed with the quote anyway in order to accommodate local variations/conditions.

In addition to event-driven assistance, the user can get on-demand assistance on invalid conditions, additional hints and warnings by selecting the "Contradictions" button as shown on the screen sample shown in FIG. 5. After the quote is adjusted based on the selected product type, the specified quantity, and type of service, the adjusted quote is displayed for the user on the screen (block 722). The user can view and process the quote at any time during the configuration process.

The user has the following additional options provided at any time during the quote process in the preferred embodiment: 1) view the quote on-line; 2) fax the quote to a fax-enabled destination using a conventional facsimile device; 3) e-mail the quote to a networked destination using a conventional electronic mail system; 4) print the quote to a system-acknowledged printer; or 5) save the quote to a file. Buttons for selecting these options are shown in FIG. 5 and the interface supporting these options is shown in FIG. 3.

Thus, a platform-independent, usage-independent, and access-independent quote configuration system has been described. The specific arrangements and methods described herein are merely illustrative of the principles of the present invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the following claims.

We claim:

1. In a computer network, a quote configurator comprising:

a client module, the client module having a user interface to receive quote input and command selections from a user, the quote input and command selections including product selection and selection of information indicative of business rules; and a server coupled to the client module across the network, the server having access to quote data and business rules, the server including a server interface configured to receive the quote input and command selections from the client module, the server validating the quote input based on the quote data and the business rules, said user interface and said server interface being comprised of platform independent byte-codes.

2. The quote configurator as claimed in claim 1 wherein the server interface is a platform-independent, usage-independent and access-independent transport protocol for messaging quote data and business rules between the server and the client module.

3. The quote configurator as claimed in claim 1 wherein the user interface is a platform-independent, usage-independent and access-independent graphical user interface.

4. The quote configurator as claimed in claim 1 wherein the client module is JAVA compatible.

5. The quote configurator as claimed in claim 1 wherein the server is JAVA compatible.

6. The quote configurator as claimed in claim 1 wherein the client interface byte-codes are interpreted for operation on a particular client platform.

7. The quote configurator as claimed in claim 1 wherein the server interface byte-codes are interpreted for operation on a particular server platform.

8. The quote configurator as claimed in claim 1 wherein the user interface includes a screen display configured for product selection and selection of information indicative of business rules.

9. The quote configurator as claimed in claim 1 wherein the client module further includes an interface to a nomadic user.

10. The quote configurator as claimed in claim 1 wherein the client module further includes an interface to an Internet user.

11. The quote configurator as claimed in claim 1 wherein the client module further includes an interface to an intranet user.

12. A method for configuring quotes comprising:

receiving quote input and command selections from a user via a user interface in a client module, the quote input and command selections including product selection and selection of information indicative of business rules;

sending said quote input and command selections to a server across a server interface, said user interface and server interface being comprised of platform independent byte-codes;

accessing quote data and business rules; and validating the quote input based on the quote data and the business rules.

13. The method as claimed in claim 12 wherein the sending further includes preparing the quote input and command selections in a platform-independent, usage-independent and access-independent transport protocol for transport to the server.

14. The method as claimed in claim 12 wherein the user interface is a platform-independent, usage-independent and access-independent graphical user interface.

15. The method as claimed in claim 12 wherein the client module is JAVA compatible.

16. The method as claimed in claim 12 wherein the server is JAVA compatible.

17. The method as claimed in claim 12 further including interpreting the client interface byte-codes for operation on a particular client platform.

18. The method as claimed in claim 12 further including interpreting the server interface byte-codes for operation on a particular server platform.

19. The method as claimed in claim 12 further including receiving a product selection and receiving a selection of information indicative of business rules.

20. The method as claimed in claim 12 further including receiving input from a nomadic user.

21. The method as claimed in claim 12 further including receiving input from an Internet user.

22. The method as claimed in claim 12 further including receiving input from an intranet user.

23. On a computer useable medium having computer readable code embodied therein, a client module for causing the computer to configure quotes, the client module comprising:

computer readable program code configured to cause the computer to receive quote input and command selections from a user via a user interface, the quote input and command selections including product selection and selection of information indicative of business rules;

computer readable program code configured to cause the computer to send said quote input and command selections to a remote server across a server interface; and computer readable program code configured to cause the computer to receive validation information from the remote server indicating whether the quote input is valid based on quote data and the business rules, said user interface and said server interface being comprised of platform independent byte-codes.

24. On a computer useable medium having computer readable code embodied therein, a server for causing the computer to configure quotes, the server comprising:

computer readable program code configured to cause the computer to receive quote input and command selections from a remote client module across a server interface;

computer readable program code configured to cause the computer to access quote data and business rules; and computer readable program code configured to cause the computer to validate the quote input based on the quote data and the business rules, said server interface being comprised of platform independent byte-codes.

* * * * *